United States Patent Office 3,393,068
Patented July 16, 1968

3,393,068
MANUFACTURE OF FERRO ALLOYS
CONTAINING SILICON
Alfred Gordon Evans Robiette, Bovingdon, England, assignor to Techmet Limited, Weybridge, England, a company of Great Britain
No Drawing. Filed June 14, 1965, Ser. No. 463,935
Claims priority, application Great Britain, June 17, 1964, 25,104/64
3 Claims. (Cl. 75—133.5)

ABSTRACT OF THE DISCLOSURE

A process for making silicon containing ferro alloys is described wherein a first type pellet of silica and coal and a second type pellet of ore and coal are heat treated to carbonize the coal and the two types of pellets are subsequently smelted together.

---

This invention relates to the manufacture of ferro alloys containing silicon. As used in this specification the term "ferro alloys containing silicon" means essentially ternary alloys in which one of the metals is silicon, such as ferro-silicon-chromium and ferro-silicon-manganese; the alloys can, however, contain small quantities of other elements, such as aluminium, carbon and phosphorus, but these are generally present as impurities. Another such alloy is ferro-silicon-aluminium.

In applicant's co-pending applications Ser. No. 253,036 filed Jan. 22, 1963, and now abandoned and Ser. N. 295,239 filed July 17, 1963 and now abandoned, applicant has described processes whereby such alloys (ferro-silicon-chromium and ferro-silicon-manganese, respectively) may be produced by intimately mixing a carbonaceous reducing agent with the ore and silica, sometimes together with a flux, and subjecting the mixture to a heat treatment so as partially to reduce the oxides in the ore prior to final reduction in an electric or other type of smelting furnace. Further, it was proposed to use a coking type coal as the carbonaceous reducing agent and form the mixture into pellets or briquettes (hereinafter referred to for convenience simply as pellets), the coal being at least partially carbonised during the heat treatment to strengthen the pellets by forming a cellular coked matrix which binds the partially reduced one together.

In practice it has been found that when a pellet made and heat treated in the manner described and subsequently smelted there is a tendency for the more readily reduced oxides, such as the iron oxides, manganese oxides and the chromium oxides to be reduced to their respective metals, preferentially to the silica, which is not reduced to silicon until the mixture attains a higher temperature. It will be understood that in the case of some ore mixed complex oxides occur.

What happens in practice, therefore, is that the silicon content of the alloy tends to fall and the silica content of the slag tends to build up, the slag also containing unreacted fine particles of carbon due to the disintegration of the pellets as a result of the iron and other oxides having reacted with a large proportion of the cellular matrix which then collapses and ceases to hold the silica particles in contact with the carbon.

It is an object of this invention to obviate this condition and to ensure that the silica is held in contact with solid carbon until reduction of the silica to silicon takes place.

According to the present invention a process for producing ferro alloys containing silicon comprises forming into pellets at least a major proportion of the silica required to be reduced to silicon and sufficient carbonaceous material for the reduction of the silica, forming into other pellets at least a major proportion of the ore or ores of the metals to be reduced and sufficient carbonaceous material for the reduction of the ore or ores into other pellets, and smelting the pellets together in a furnace.

Preferably the carbonaceous material is a medium to strongly coking coal and the pellets are subjected to preliminary heat treatment (also termed pre-treatment) to carbonise the coal at least partially, forming a cellular coked matrix.

Two kinds of pellets can be mixed prior to the final reduction or even prior to the preliminary heat treatment, or they can be charged separately into the melting furnace.

The silica-containing pellets can be charged, for instance, around the electrodes of an electric furnace to ensure that they pass through the highest temperature zone, which is adjacent to the electrode tips but it has also been found satisfactory to mix the pellets in the required proportions and to charge them as a mixture.

The two types of pellets can undergo the preliminary heat treatment outside the electric or other final reduction furnace, or they can be subjected to this treatment in the upper part of the electric furnace with the heat transferred by the furnace gases.

In the pre-treatment of the silica-containing pellets at temperatures of the order of 800 to 1200° C. no pre-reduction of the silica occurs; the pre-treatment mainly serves to produce a coked matrix or network of carbon which binds the silica particles together until they reach a reduction temperature in the smelting furnace. On the other hand, if a silica containing pellet were pre-heated to 1550° C., reduction to silicon would start at about that temperature. In other words, reduction of silica takes place in the solid state although the product of the reduction, silicon, is molten at this temperature and would appear as small globules in the pellets.

In an example of the method of the invention for the production of a ferro-silicon-chrome alloy, two distinct kinds of pellets were made, namely:

(a) pellets designed to make ferro-chrome, and
(b) pellets designed to make silicon.

The ferro-chrome pellets were made from a mixture containing:

| | Parts |
|---|---|
| Chrome ore | 100 |
| Coking coal | 34 |
| Silica sand as a flux | 9 |

The silicon pellets were made from:

| | Parts |
|---|---|
| Silica sand | 100 |
| Coking coal | 72 | both kinds of pellets, after rolling, were dried and then pre-treated in a shaft by heating with gas to a temperature of 1100° C.

After cooling the pellets were mixed in the proportion of:

| | Lbs. |
|---|---|
| Chrome ore-containing pellets | 190 |
| Silica-containing pellets | 200 |

Mixture of pellets was charged into an electric furnace and produced an alloy containing 38% chromium, 42% silicon, the balance being mainly iron. A slag was also produced which contained 50% silica together with alumina, magnesia and lime which derived principally from the chrome ore, but also from the coal ash.

What I claim as my invention and desire to secure by Letters Patent is:

1. A process for producing ferro alloys containing silicon from silica and ore containing the iron and alloying values which comprises forming into pellets of a first type at least a major proportion of the silica required to be reduced to silicon and sufficient medium to strongly coking coal for reduction of said silica, forming into pellets of a second type at least a major proportion of the ore to be reduced and sufficient medium to strongly coking coal for the reduction of said ore, subjecting said two types of pellets to preliminary heat treatment to carbonize said coal at least partially and thereby form a cellular coked matrix, and smelting together in a furnace pellets of said first type and pellets of said second type to result in said ferro alloys containing silica.

2. A process according to claim 1 in which said preliminary heat treatment of said pellets of said first type is effected at a temperature in the range 800 to 1200° C. whereby no significant reduction of silica occurs during the preliminary heat treatment.

3. A process according to claim 1 in which said preliminary heat treatment of said pellets of said first type is carried out at a temperature in the range 1200 to 1550° C. whereby appreciable reduction of said silica takes place in the solid state with the formation of small globules of silicon in said pellets.

References Cited

UNITED STATES PATENTS

| | | | |
|---|---|---|---|
| 1,379,022 | 5/1921 | Jones | 75—133.5 |
| 1,857,779 | 5/1932 | Flodin et al. | 75—133.5 X |
| 1,863,642 | 6/1932 | Stimson et al. | 75—133.5 |
| 2,387,130 | 10/1945 | Feild | 75—130.5 |
| 2,397,262 | 3/1946 | Heist | 75—133.5 |
| 2,631,936 | 3/1953 | Kuhlmann | 75—130.5 X |
| 2,833,645 | 5/1958 | Erasmus | 75—130.5 X |

FOREIGN PATENTS 157,944   1922   Great Britain.

HYLAND BIZOT, *Primary Examiner.*

DAVID L. RECK, *Examiner.*

H. W. TARRING, *Assistant Examiner.*